United States Patent [19]

Meurer

[11] Patent Number: 4,680,861
[45] Date of Patent: Jul. 21, 1987

[54] SEATBELT CUTTER

[76] Inventor: Wilhelm K. Meurer, 65 Wynford Heights Cres., Apt. 2005, Don Mills, Ontario, M3C 1L7, Canada

[21] Appl. No.: 721,454

[22] Filed: Apr. 9, 1985

[51] Int. Cl.⁴ .............................................. A47F 5/08
[52] U.S. Cl. .................................. 30/296 A; 211/89; 248/37.3
[58] Field of Search ................ 30/294, 296 A, 296 B; 211/89; 248/37.3, 37.6

[56] References Cited

U.S. PATENT DOCUMENTS

| D. 254,243 | 2/1980 | Florian | 30/294 X |
|---|---|---|---|
| 1,553,449 | 9/1925 | Kennedy | 30/294 |
| 2,089,537 | 8/1937 | Champlin | 248/37.6 |
| 2,388,221 | 10/1945 | Smith | 211/89 X |
| 2,593,601 | 4/1952 | Pollack | 30/294 X |
| 3,365,798 | 1/1968 | Cunningham | 30/294 |
| 3,946,877 | 3/1976 | Galicia | 211/89 |
| 3,986,260 | 10/1976 | Whiteford | 30/296 A |
| 4,134,206 | 1/1979 | Beerman | 30/294 |
| 4,325,484 | 4/1982 | Berry | 211/89 |
| 4,349,960 | 9/1982 | Kwasniak | 30/296 A |

Primary Examiner—Jimmy C. Peters
Attorney, Agent, or Firm—Browdy and Neimark

[57] ABSTRACT

A cutter for automotive seatbelts and restraint harnesses, for use in emergencies, comprises a flat body portion containing a protected blade, access to the blade being provided by means of an elongated slit into which the seatbelt fits. A holder is provided, for releasable mounting on the automobile interior at a convenient location, into which the cutting device is a releasable snap fit.

5 Claims, 4 Drawing Figures

SEATBELT CUTTER

FIELD OF THE INVENTION

This invention relates to automobile safety restraint harnesses and seatbelts, and more particularly to a device to loosen cuttable seatbelts in vehicles in case of emergency, without use of a release button.

BACKGROUND OF THE INVENTION

It is well recognized and established that the use of seatbelts by drivers and passengers in automobiles can avoid or cut down the seriousness of injuries incurred in automobile accidents. In many areas, the use of automobile seatbelts has become mandatory. However, there is still a reluctance to use them fully, on the part of many drivers and automobile passengers, because of perceived lack of freedom of movement and lack of comfort. Another contributing factor to lack of use of seatbelts is a fear on the part of the wearer that the seat belt might act as a trap preventing escape from the vehicle after an accident, in case of fire or the like. Contributing to this fear is the fact that often the release mechanisms of seatbelts and restraint harnesses are complicated and inconvenient to reach.

SUMMARY OF THE INVENTION

The present invention has as an object the provision of a device for use in emergencies to cut through and hence release a seatbelt or automobile restraint harness.

According to the present invention, there is provided a device for cutting and severing seatbelts and restraint harnesses to free the wearer thereof in case of emergency, the device comprising a generally flat body portion with a hand grip area and having a elogated slit therein, dimensioned in both length and width so as to receive a seatbelt edgewise for cutting purposes. Disposed within the elongated slit is a blade with an outwardly presented cutting edge, within the thickness of the flat body portion. The device also includes a holder in which the flat body portion is a snapfit, the holder being mountable at any selected place within an automobile interior, and being adapted releasably to hold the flat body portion for easy release and reattachment, by the seatbelt wearer in an emergency.

BRIEF REFERENCE TO THE DRAWINGS

FIG. 1 of the accompanying drawings is a front view of the seatbelt cutter and holder therefor in assembled relationship, in accordance with the specific most preferred embodiment of the invention;

DESCRIPTION OF THE PREFERRED EMBODIMENTS

The device of the present invention is preferably made of strong plastic material, e.g. impact polystyrene, polyethylene, polypropylene, ABS plastic and the like. It may conveniently be fabricated in two similar flat halves, laminated together with the blade sandwiched between them, as by solvent welding, heat sealing, ultrasound welding or the like. In the preferred embodiment, positive gripping means such as a handle protrusion, hook or finger receiving aperture is provided so that the operator can grip the device sufficiently to exert the necessary cutting force on the blade. Preferably also, the cutting blade is disposed near the center of the body of the device, to be surrounded by sufficient structural material to withstand the necessary cutting forces exerted thereon.

The holder for the device is preferably U-shaped, the elongated web portion forming the base of the U being provided with attachment means whereby it may be secured at a desired location within the automobile. Two sided tape provides a convenient means of releasable attachment. The holder is preferably made of the same or similar plastics material to that of the body portion, and is provided with a degree of resilience for releasable gripping purposes of the body portion. The body portion is dimensioned so as to be a close fit between the legs of the U-shaped holder. The holder is suitably provided with internal forwardly presented ribs, so that the body portion interfitted therein protrudes a short way forwardly from the base of the U-shaped holder, for ease of gripping for removal and use in emergency. Preferably also, each leg of the U-shaped holder has an inwardly extending projection at its extremity, behind which the body portion is a snapfit, and which defines a track of appropriate width to hold the body portion firmly in position.

DETAILED DESCRIPTION OF THE SPECIFIC PREFERRED EMBODIMENT

Figure 1:
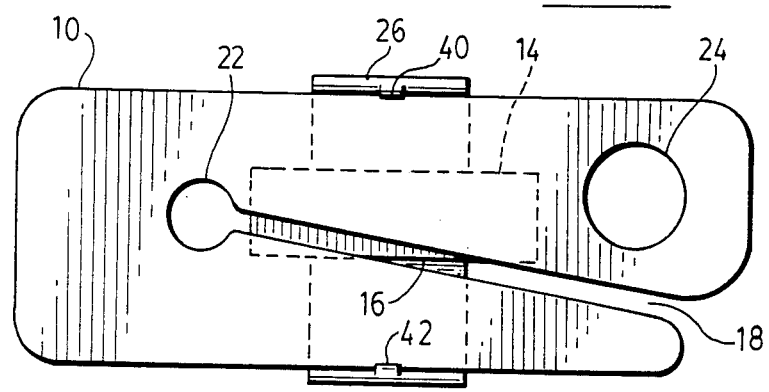
Figure 2:
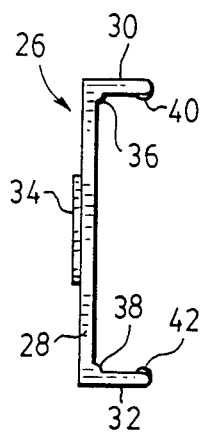
FIG. 2 is an end view of the holder of the assembly of FIG. 1.

With reference to the accompanying drawings, and specifically FIG. 1 thereof, the device according to the present invention comprises a body portion 10 constituted by two essentionally similar flat laminated halves 11, 12 (see FIG. 3), fastened together as by solvent welding to form the flat, generally rectangular body portion 10. The body portion 10 is made of suitable thermoplastic material and appropriately coloured. Between the flat halves 11, 12, there is provided a rectangular steel blade 14 having a lower cutting edge 16.

The body portion is formed with an elongated slit 18 extending substantially diagonally across the major portion of the length thereof, the open mouth 20 thereof being bounded by curved body surfaces to provide easy access for a seatbelt. The width of slit 18 is appropriately chosen readily to accommodate the thickness of an automotive seatbelt, but to allow only very restricted up and down movement of a seatbelt received therein. A portion of the cutting edge 16 of the blade 14 is disposed obliquely within slit 18, to effect cutting of a seatbelt drawn into the slit 18. The slit 18 terminates in an enlarged blind end 22, so that cut seatbelt portions will not interfere with the cutting of further seatbelt portions by the blade 16. The slit 18 is sufficiently narrow that cutting edge 16 of the blade is effectively shielded for extra safety when not in use. It will also be noted that the cutting edge 16 is provided near the centre of the rectangle defined by the perimeter of the body portion, thereby providing structural strength in the device to withstand the force of cutting a seatbelt therewith. Above the open mouth 20 of slit 18 there is provided a hole 24 suitably dimensioned to receive the index finger of a user, thereby to act as a handle means whereby the device may be firmly and positively gripped for operation.

Figure 3:
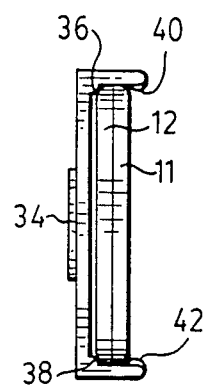
FIG. 3 is an end view of the assembly of FIG. 1.

The device also includes a holder 26 of generally U-shaped form in cross-section, having an elongated planar base 28 and similar opposed short arms 30, 32 projecting forwardly from the base. The rear surface of the base 28 is provided with a length of two-sided tape 34 for releasable attachment to any desired convenient location inside the body of the automobile, within reach of the user. The arms 30, 32 of the holder 26 are each provided, at their rearward extremity adjoining the base 28, with a respective forwardly protruding elongate rib 36, 38, extending the full width of the holder 26. Also, adjacent their midportions, each arm 30, 32 is provided with a respective inwardly extending protrusion 40, 42, at the approximate midpoint of the length thereof. When the body portion 10 is assembled with the holder 26, it snaps behind the protrusions 40, 42 to fit snugly between these protrusions and the ribs 36, 38, as shown in FIG. 3, but to be easily releasable therefrom, on account of the resilience of the material from which the holder is made, by the operator's gripping the body portion 10, as by means of the hole 24, and simply snapping the body portion away from the holder.

Figure 4:
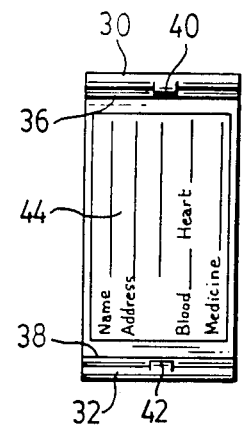
FIG. 4 is a front view of the holder, with the body portion of the seatbelt cutter removed therefrom.

The front surface of the base 28 of holder 26, as shown in FIG. 4, is provided with an identification panel 44 on which may be entered relevant information concerning the identity and characteristics of the user of the device, of assistance to rescue personnel in the event of an emergency. The panel 44 becomes readily visible once the body portion 10 is removed from the holder 26.

The provision of the holder 26 with its attachment means permits the device to be mounted substantially anywhere within the interior of the automobile, at the user's convenience, for easy reaching in an emergency. The provision of ribs 36, 38 on the holder 26 not only provides for a snug fit of the body portion 10 within the holder 26 when stored out of use, but also ensures that the body portion is disposed some distance from the supporting structure on which the holder 26 is mounted. This ensures that the user can remove the body portion from the holder 26 without difficulty, in the event of emergency, by being able to reach between the body portion 10 and the structure of the automobile to which it is mounted. It will also be appreciated that the holder is mountable within the autombbile at any convenient angle. Moreover, the body portion 10 is reversible within the holder 26, so as to dispose the hole 24, acting as a handle either to the user's right-hand side or left-hand side according to choice, thereby accommodating the needs of both left-handed and right-handed users.

Whilst a specific preferred embodiment of the invention has been described and illustrated herein, it will be appreciated that this is for purposes of illustration and exemplification only, and the scope of the invention is limited only by the scope of the appended claims.

I claim:

1. Device for cutting and severing seatbelts and restraint harnesses to free the occupant thereof in case of emergency, said device comprising:
   a generally flat body portion having a hand grip area;
   an open ended elongated slit therein, said slit being dimensioned in both length and width so as to receive a seatbelt edgewise for cutting purposes;
   a blade having a cutting edge disposed in said elongated slit, the cutting the edge thereof being disposed within the thickness of the flat body portion; said cutting edge of the blade also forming an oblique angle with the side walls of the slit;
   a holder for releasably receiving said body portion therein, said holder including:
   a base having an exterior surface for the disposition of an adhesive material for the releasable attachment of said base to a surrounding support structure;
   releasable retension means to maintain said flat body portion in a stored position, such that said hand grip area is exposed from and spaced from said holder, to facilitate the gripping of said hand grip area for rapid release, said releasable retension means including a pair of arms cooperating with said holder to define a generally U-shaped in cross-section, the said arms thereof being integral with the said base and spaced apart a sufficient distance to receive the body portion as a releasable snap fit therebetween, and;
   elongate ribs protruding from said base and adapted to receive said body portion thereagainst, in a position spaced away from the interior surface of the base.

2. Device according to claim 1 wherein each arm of the retention means has a respective protrusion near the midpoint of its length and extending mutually towards one another, the body portion being a releasable snap fit behind said protrusions to be releasably held between the elongate ribs and said protrusions.

3. Device according to claim 2 wherein the interior surface of the base of the holder includes a display panel for entry of written information thereon.

4. Device according to claim 3 wherein the body portion includes a gripping means in the form of an aperture disposed near the open end of the elongate slit, adapted to receive an operator's finger therein for positive gripping and pulling of the device relative to a seatbelt to be cut.

5. Device according to claim 4 of generally rectangular overall shape, the cutting edge of the blade being disposed near the centre of the rectangle so as to provide structural stength for the seatbelt cutting operation therewith.

* * * * *